United States Patent
Mizuno

(10) Patent No.: US 6,994,178 B2
(45) Date of Patent: Feb. 7, 2006

(54) ON-VEHICLE STRUCTURE OF FUEL CELL SYSTEM

(75) Inventor: Minobu Mizuno, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/170,394

(22) Filed: Jun. 14, 2002

(65) Prior Publication Data

US 2002/0189873 A1   Dec. 19, 2002

(30) Foreign Application Priority Data

Jun. 15, 2001  (JP)  ............................. 2001-181696

(51) Int. Cl.
   *B60K 6/04*  (2006.01)
(52) U.S. Cl. ..................... 180/65.3; 180/299; 180/312; 903/908; 903/951
(58) Field of Classification Search ............... 180/65.3, 180/65.1, 65.6, 291, 299, 69.4, 314, 312; 903/908, 951
See application file for complete search history.

(56) References Cited

U.S. PATENT DOCUMENTS

| | | | |
|---|---|---|---|
| 4,081,693 A * | 3/1978 | Stone | 307/66 |
| 4,263,980 A * | 4/1981 | Harlow et al. | 180/292 |
| 5,096,010 A * | 3/1992 | Ojala et al. | 180/68.3 |
| 5,193,635 A * | 3/1993 | Mizuno et al. | 180/65.3 |
| 5,248,566 A | 9/1993 | Kumar et al. | |
| 5,460,234 A * | 10/1995 | Matsuura et al. | 180/65.1 |
| 5,641,031 A * | 6/1997 | Riemer et al. | 180/65.3 |
| 5,662,184 A * | 9/1997 | Riemer et al. | 180/65.3 |
| 6,109,654 A * | 8/2000 | Yamamoto et al. | 280/784 |
| 6,223,843 B1 * | 5/2001 | O'Connell et al. | 180/65.3 |
| 6,371,229 B1 * | 4/2002 | Kakiuchi | 180/65.2 |
| 6,378,637 B1 * | 4/2002 | Ono et al. | 180/65.3 |
| 6,429,019 B1 * | 8/2002 | Goldstein et al. | 436/134 |
| 6,443,253 B1 * | 9/2002 | Whitehead et al. | 180/68.1 |
| 6,494,286 B2 * | 12/2002 | Shimizu et al. | 180/299 |
| 2003/0070858 A1 * | 4/2003 | Kondo | 180/291 |
| 2004/0090085 A1 * | 5/2004 | Kawasaki et al. | 296/187.09 |

FOREIGN PATENT DOCUMENTS

| | | |
|---|---|---|
| DE | 100 21 044 | 11/2000 |
| EP | 1 010 875 | 6/2000 |
| JP | 2001-113960 | 4/2001 |

* cited by examiner

*Primary Examiner*—Jeff Restifo
(74) *Attorney, Agent, or Firm*—Oblon, Spivak, McClelland, Maier & Neustadt, P.C.

(57) ABSTRACT

A motor for driving an axle shaft of a vehicle, a fuel cell, and a power control unit are arranged in the same space of a vehicle body in an electric vehicle. The motor is mounted on a suspension frame. The fuel cell and power control unit are mounted on a FC frame provided on the suspension frame.

7 Claims, 4 Drawing Sheets

ON-VEHICLE STRUCTURE OF FUEL CELL SYSTEM

INCORPORATION BY REFERENCE

The disclosure of Japanese Patent Application No 2001-181696 filed on Jun. 15, 2001 including the specification, drawings and abstract is incorporated herein by reference in its entirety.

BACKGROUND OF THE INVENTION

1. Field of the Invention

The present invention relates to a manner of arranging components in an electric vehicle equipped with a fuel cell.

2. Description of the Related Art

As a related art of the present invention, an arranging of components in an electric vehicle was disclosed in a Japanese Patent Application Laid-Open Publication No. 2001-113960. According to this related art, a fuel tank, a fuel reforming device, a fuel cell, and a second fuel cell are arranged under a floor of the vehicle along the front and rear direction of a vehicle body in this order. The above-described structure is intended to achieve an effective arrangement of the components without excessively reducing the space for passengers and trunk volume.

However, the space for mounting the fuel tank, the fuel reforming device, the fuel cell, and the second cell is relatively narrow since each component is arranged under the floor of the vehicle. Furthermore, the passenger is excessively elevated from the ground due to the required space for these components. In other words, the space for passengers is greatly restrained by the arrangement of main components in an electric vehicle of the related art.

SUMMARY OF THE INVENTION

The present invention is for obviating the above-mentioned problems. Therefore, it is an object of the present invention to provide a technology to alleviate restrictions on a space for passengers in an electric vehicle equipped with a fuel cell.

An electric vehicle according to a first aspect of the present invention includes a motor which drives an axle shaft of the vehicle, a fuel cell which supplies power to the motor, and a control unit which controls operations of the motor and the fuel cell. Furthermore, the motor, the fuel cell and the control unit are arranged in the same space of a vehicle body in the electric vehicle to achieve at least a part of the above-mentioned object.

The motor, the fuel cell, and the control unit are arranged in the same space of the vehicle body in the electric vehicle so that any restriction on a space for passengers caused by these components is reduced. Therefore, it is easy to secure a sufficient space for passengers.

In this connection, the motor, the fuel cell and the control unit may be arranged in a space under a hood.

When components such as the motor are arranged under the hood, restriction on the space for passengers caused by these components is minimized.

It is preferable that the motor, the fuel cell, and the power control unit be integrally assembled to form an assembled body and the assembled body be mounted on the vehicle body.

It is easy to assemble and install the motor, the fuel cell, and the power control unit according to the above-described structure.

A method for assembling an electric vehicle of a second aspect of the present invention includes the following two steps. The first step is for assembling an assembled body including a motor for driving an axle shaft of the vehicle, a fuel cell for supplying power to the motor, and a control unit for controlling the motor and the fuel cell. The second step is for mounting the assembled body on a vehicle body from the underside of the vehicle body.

According to the second aspect of the present invention, it is easy to assemble the motor, the fuel cell and the power control unit and to install these components in the vehicle body.

The present invention can be embodied by various aspects such as an electric vehicle and a method for assembling the vehicle, a fuel cell system and a method for assembling the system, and so forth.

BRIEF DESCRIPTION OF THE DRAWINGS

The forgoing and further objects, features and advantages of the invention will become apparatus from the following description of preferred embodiments with reference to the accompanying drawings, wherein like numerals are used to represent like elements and wherein.

DETAILED DESCRIPTION OF THE PREFERRED EMBODIMENTS

The following explains the aspects of the present invention according to a preferred embodiment.

Figure 1:
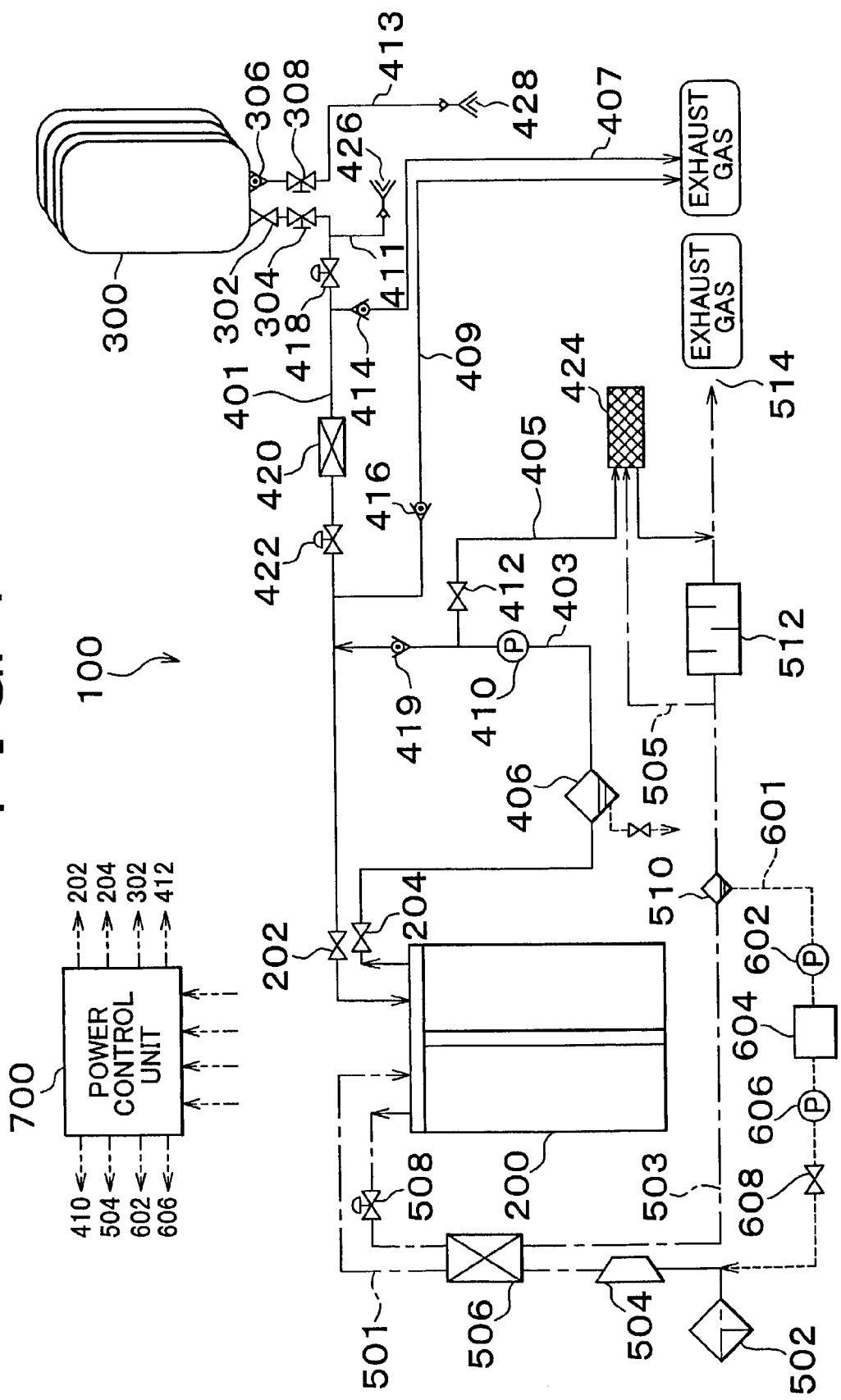
FIG. 1 is an explanatory view of the interior structure of a fuel cell system 100.

Referring to FIG. 1, a fuel cell system 100 in a vehicle includes a fuel cell 200 which is supplied with hydrogen gas to generate power and a high-pressure hydrogen gas tank 300 which supplies hydrogen gas to the fuel cell 200.

The fuel cell 200 is supplied with oxidized gas containing oxygen, such as air, along with hydrogen gas containing hydrogen, and causes the electric-chemical reactions shown as the reaction formulas below, at a hydrogen electrode and an oxygen electrode, to generate power.

In other words, hydrogen gas is supplied to the hydrogen electrode and oxygen gas is supplied to the oxygen electrode. The reaction (1) is caused on the side of the hydrogen electrode and the reaction (2) is caused on the side of the oxygen electrode. In the entire fuel cell, the reaction (3) is caused.

$$H_2 \rightarrow 2H^+ + 2e^- \qquad (1)$$

$$2H^+ + 2e^- + (1/2)O_2 \rightarrow H_2O \qquad (2)$$

$$H_2 + (1/2)O_2 \rightarrow H_2O \qquad (3)$$

When the fuel cell 200 is a power source of the vehicle, a driving motor is driven by power generated by the fuel cell 200. Then torque generated from the driving motor 800 is transmitted to an axle shaft of the vehicle through a gear 810 to drive both a wheel and a wheel, thereby propelling the vehicle.

The fuel cell 200 is a fuel cell stack including well known plural single cells stacked. A single cell includes an electrolytic membrane such as a NAFION (a trademark of Dupont), the hydrogen electrode and the oxygen electrode (non-woven fabric for carbon) which are diffusion electrodes, and two separators which are made of sintered carbon. In this case, the electrolytic membrane is located between the diffusion electrodes and the diffusion electrodes are located between the separators. Uneven portions are formed on both sides of the separators and the uneven portions form intra-cell gas channels between the hydrogen electrode and the oxygen electrode. Hydrogen gas supplied in the above-described way flows in the intra-cell gas channels formed between one separator and the hydrogen electrode. On the other hand, oxidized gas flows in the intra-cell gas channels formed between the other separator and the oxygen electrode. When mounting the fuel cell stack on the vehicle, the fuel cell stack is stored in a stack case and installed in the vehicle.

Figure 2:
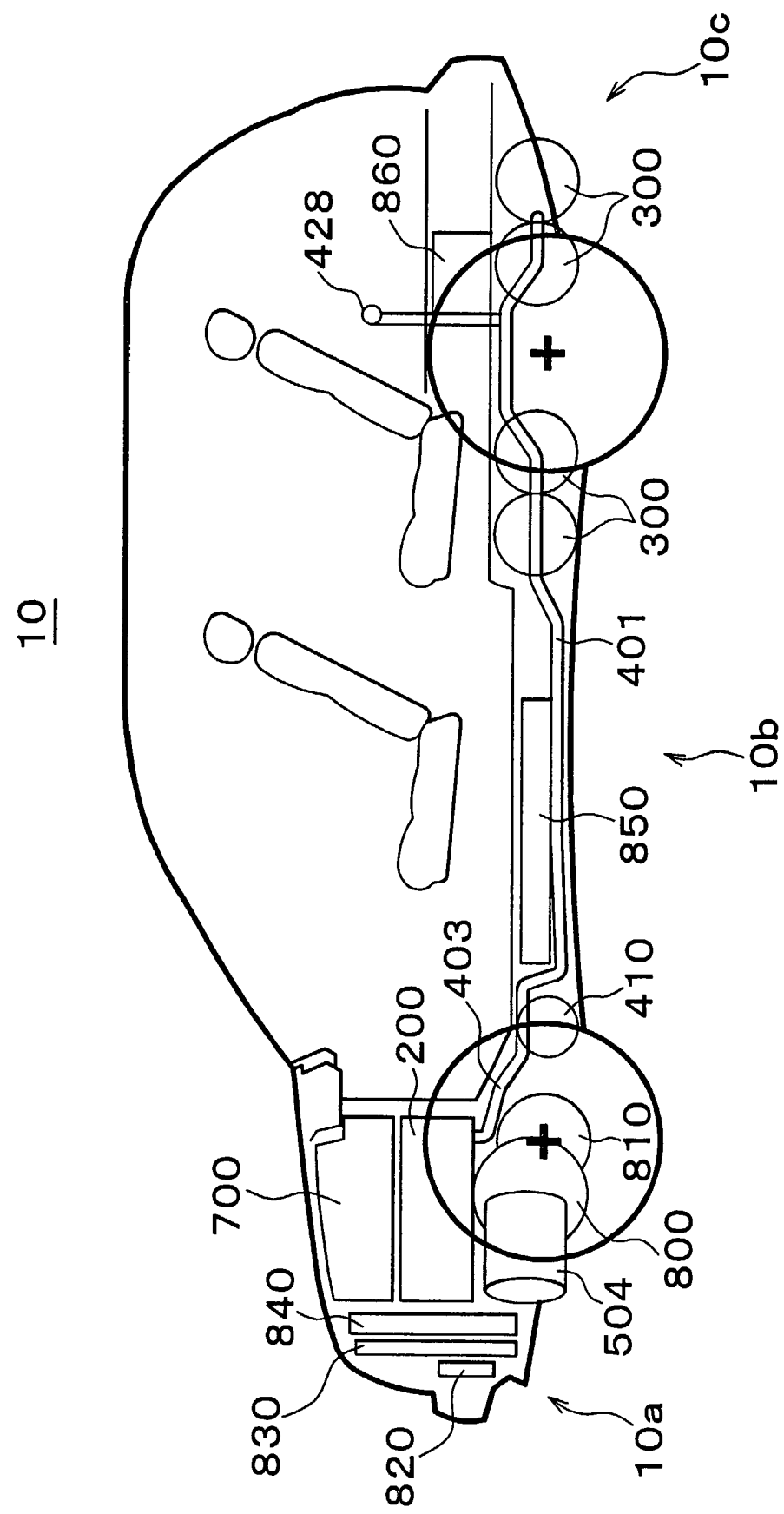
FIG. 2 is a schematic view of an electric vehicle according to a preferred embodiment of the present invention.

High-pressure hydrogen gas is stored in a high-pressure hydrogen tank 300 which discharges the high-pressure hydrogen gas at pressures ranging approximately from 20 to 35 Mpa by opening a shut valve 302 attached at the base of the tank. According to the preferred embodiment, four high-pressure hydrogen gas tanks 300 are mounted under the rear floor of the vehicle as shown in FIG. 2.

In addition, the fuel cell system 100 of the preferred embodiment includes a hydrogen gas channel (the solid lines shown in FIG. 1) for circulating hydrogen gas in the system, an oxidizing gas channel (the single-dash chain lines shown in FIG. 1) for circulating oxidizing gas in the system, a water circulation channel 601 (the dashed line shown in FIG. 1) for circulating water contained in oxygen off-gas, and a power control unit 700 for controlling the entire system.

The hydrogen gas channel includes a main channel 401 originating from a discharge outlet of the high-pressure hydrogen gas tank 300 and ending at a supply inlet of the fuel cell 200, a circulation channel 403 originating from a discharge outlet of the fuel cell 200 and ending at a point midway of the main channel 401 via a pump 410, a discharging channel 405 for discharging impurities in the circulating hydrogen gas, relief channels 407 and 409 for discharging the hydrogen gas when the hydrogen gas is under abnormal pressures, a leak check channel 411 for checking leakage of the hydrogen gas, and a supply channel 413 originating from a hydrogen gas supply port 428 and ending at a charge inlet of the high-pressure hydrogen gas tank 300. The preferred embodiment uses the high-pressure hydrogen gas tank 300 as a supply source of the hydrogen gas to discharge the high-pressure hydrogen gas.

The shut valve 302 and a discharge manual valve 304 are arranged at the discharge outlet of the high-pressure hydrogen gas tank 300 on the main channel 401. A depressurizing valve 418, a heat exchanger 420 and a depressurizing valve 422 are arranged at points midway of the main channel 401, and a shut valve 202 is arranged at the supply inlet of the fuel cell 200. A shut valve 204 is arranged at the discharge spout of the fuel cell 200 on the circulation channel 403 and a gas-liquid separator 406, pump 410 and a reverse flow preventing valve 419 are arranged at points midway of the circulation channel 403. A reverse flow preventing valve 306 and a charge manual valve 308 are arranged at the charge inlet of the high-pressure hydrogen gas tank 300 on the supply channel 413. A shut valve 412 and a hydrogen dilutor 424 are arranged on the discharging channel 405. Furthermore, a relief valve 414, a relief valve 416, and a leak check port 426 are arranged on the relief channel 407, the relief channel 409, and the leak check channel 411, respectively.

The following explains the oxidizing gas channel. The oxidizing gas channel includes an oxidizing gas supplying channel 501 for supplying oxidizing gas to the fuel cell 200, an oxygen off-gas discharging channel 503 for discharging oxygen off-gas discharged from the fuel cell 200 and an oxygen off-gas introducing channel 505 for introducing oxygen off-gas to the hydrogen dilutor 424.

An air cleaner 502, a compressor 504 and a moisturizing module 506 are arranged on the oxidizing gas supplying channel 501. A pressure adjusting valve 508, the moisturizing module 506, a gas-liquid separator 510, a silencer 512 and an off-gas discharging spout 514 are arranged on the oxygen off-gas discharging channel 503.

Pumps 602 and 606, a moisturizing water tank 604 and an injector 608 are arranged on the water circulation channel 601.

Furthermore, a power control unit 700 inputs detection results from various sensors (not shown) and controls the valves 202, 204, 302 and 412, the pumps 410, 602 and 606, and the compressor 504. Control lines have been omitted from FIG. 1. Driving motors are provided to the pump 410, the compressor 504 and the pumps 602 and 606, respectively. The motors have also been omitted from FIG. 1. The discharge manual valve 304 and the charge manual valve 308 are opened and closed manually.

The following briefly explains the flow of the oxidized gas. When the compressor 504 is driven by the power control unit 700, air as oxidizing gas is taken in through the air cleaner 502. The air is cleaned by the air cleaner 502 and pressurized by the compressor 504. Then the pressurized air flows through the oxidized gas supplying channel 501 and is supplied to the fuel cell 200 through the moisturizing module 506.

The supplied oxidized gas is discharged as oxygen off-gas after being used for the above-described electric-chemical reaction in the fuel cell 200. Then the discharged oxygen off-gas flows through the oxygen off-gas discharging channel 503 and flows back to the moisturizing module 506 after flowing through the pressure adjusting valve 508.

As described above, water ($H_2O$) is formed according to the formula (2) on the side of the oxygen electrode of the fuel cell 200. Therefore, the oxygen off-gas discharged from the fuel 200 contains a lot of moisture. On the other hand, the oxidized gas (air) taken in form the atmosphere and pressurized by the compressor 504 is low-humidity gas.

According to the preferred embodiment, the oxidizing gas supplying channel 501 and the oxygen off-gas discharging channel 503 pass through the same moisturizing module. Then water vapor is exchanged between the oxidizing gas supplying channel 501 and the oxygen off-gas discharging channel 503 to moisturize the dry oxidizing gas from the very wet oxygen off-gas. As a result, the oxidizing gas, which flows out of the moisturizing module 506 and is supplied to the fuel cell 200, becomes wetted to a certain extent. On the other hand, the oxygen off-gas, which flows out of the moisturizing module 506 and is discharged into the atmosphere outside the vehicle, becomes drier to a certain extent.

Then the oxygen off-gas, which has been dried to a certain extent at the moisturizing module 506 as describes above, flows into the gas-liquid separator 510. The oxygen off-gas from the moisturizing module 506 is separated into gas and liquid by the gasliquid separator 510. Liquid water contained in the oxygen off-gas is further removed to dry the oxygen off-gas further. The removed water is recovered as recovered water and is pumped by the pump 602 to be stored in the moisturizing water tank 604. Then the recovered water is pumped to the injector 608 by the pump 606 and is atomized at an inlet of the compressor 504. As a result of this, the oxidizing gas from the air cleaner 502 is mixed with desired amount of moisture (water vapor). Therefore, the oxidizing gas flowing through the oxidizing gas supplying channel 501 is wetted further in addition to the moisturizing at the moisturizing module 506.

Fluctuations in pressure of the oxygen off-gas, which becomes drier at the gas-liquid separator 510 as described above, are alleviated and the oxygen off-gas is introduced into the silencer 512. Then the oxygen off-gas is discharged into the external atmosphere from the off-gas discharging outlet 514.

The following explains the flow of the hydrogen gas. Under normal conditions, the discharge manual valve 304 of the high-pressure hydrogen tank 300 is constantly open and the charge manual valve 308 of the high-pressure hydrogen tank 300 is constantly closed. The shut valve 302 of the high-pressure hydrogen tank 300 and the shut valves 202 and 204 of the fuel cell 200 are opened by the power control unit 700 when the fuel cell system is driven and the shut valves 302, 202 and 204 are closed by the power control unit 700 when the fuel cell system is not driven. The shut valve 412 of the discharging channel 405 is closed by the power control unit 700 when the fuel system is driven. The relief valves 414 and 416 are closed under normal pressures and open under abnormal pressures to relieve excess pressure.

When the fuel cell system is driven and the power control unit 700 opens the shut valve 302 as described above, the hydrogen gas is discharged form the high-pressure hydrogen tank 300. The discharged hydrogen gas is supplied to the fuel cell 200 after flowing through the main channel 401 and used for the above-described electriccchemical reactions in the fuel cell 200. The used gas is discharged as hydrogen off-gas and flows back to the main channel 401 after flowing through the circulation channel 403. Then the hydrogen off-gas is supplied back to the fuel cell 200. At this time, the hydrogen off-gas flowing through the circulation channel 403 is pressurized and pumped into the main channel 401 by driving the pump 410 provided at a point midway of the circulation channel 403. As described above, the hydrogen gas circulates in the main channel 401 and the circulation channel 403. On the circulation channel 403, the reverse flow preventing valve 419 is provided between a point where the circulation channel 403 is connected to the main channel 401 and the pump 410 to prevent the circulating hydrogen off-gas from flowing reversely.

By reintroducing the hydrogen off-gas into the main channel 401 as described above, the apparent flow amount and flow velocity of the hydrogen gas supplied to the fuel cell 200 increases, even though the amount of hydrogen used in the fuel cell 200 is the same. Therefore, the increase of flow amount and flow velocity of the hydrogen gas provides favorable conditions from the point of view of supplying hydrogen to the fuel cell 200. As a result of this, the output voltage of the fuel cell 200 increases.

Furthermore, impurities such as nitrogen in the air, which leaks from the side of the oxygen electrode to the side of the hydrogen electrode after permeating through the electrolytic membrane, do not collect around the hydrogen electrode since the hydrogen gas circulates. Therefore, the output voltage of the fuel cell 200 does not drop due to an obstacle to a power generating function of the fuel cell 200 caused by collection of impurities such as nitrogen.

Even if the hydrogen gas is introduced uniformly in the fuel cell system, impurities constantly leak from the side of the oxygen electrode to the side of the hydrogen electrode in the fuel cell 200. Therefore, the concentration of impurities in the uniformed hydrogen gas gradually increases and that of the hydrogen decreases accordingly. To obviate the above-described problem, the shut valve 412 provided on the discharging channel 405 which branches from the circulation channel 403 is kept open periodically by the power control unit 700 to discharge a part of the hydrogen gas containing the impurities. A part of the hydrogen gas including the impurities is discharged from the circulation channel by opening the shut valve 412 and pure hydrogen gas is introduced from the high-pressure hydrogen tank 300 accordingly. As a result of this, the concentration of impurities in the hydrogen gas decreases and that of the hydrogen increases. Therefore, the fuel cell 200 can continuously and appropriately generate power. Though the time interval for opening the shut valve 412 differs depending on driving conditions and output, it may be once in five seconds, for example.

In this connection, the output voltage of the fuel cell 200 drops only for an instant and does not drop dramatically even if the shut valve 412 is opened when the fuel cell generates power. No longer than one second for opening the shut valve 412 is preferable. For example, around 500 :sec is more preferable.

The hydrogen gas discharged from the shut valve 412 is supplied to the hydrogen dilutor 424 after flowing through the discharging channel 405. Oxygen off-gas is also supplied to the hydrogen dilutor 424 after flowing through the oxygen off-gas introducing channel 505 which branches from the oxygen off-gas discharging channel 503. The hydrogen dilutor 424 dilutes the discharged hydrogen gas from the shut valve 412 by mixing the supplied hydrogen gas and the oxygen off-gas. The diluted hydrogen gas is introduced into the oxygen off-gas discharging channel 503 and is further mixed with the oxygen off-gas flowing in the oxygen off-gas discharging channel 503. Then the mixed gas is exhausted into the external atmosphere from the off-gas discharging outlet 514.

The pump 410 is controlled by the power control unit 700 and changes flow velocity of the hydrogen off-gas flowing in the circulation channel 403. In other words, the amount of hydrogen gas is supply as fuel according to the power generated from the fuel cell 200.

The two depressurizing valves, the depressurizing valve 418 for the primary depressurization and the depressurizing valve 422 for the secondary depressurization are provided around an outlet of the high-pressure hydrogen tank 300. These two valves depressurize the high-pressure hydrogen gas in the high-pressure hydrogen gas tank 300 in two steps. Specifically the depressurizing valve 418 for the primary depressurization depressurizes the high-pressure hydrogen gas from pressures approximately ranging from 20 to 35 Mpa to pressures approximately ranging from 0.8 to 1 Mpa. Then the depressurizing valve 422 for the secondary depressurization depressurizes the high-pressure hydrogen gas from pressures approximately ranging from 0.8 to 1 Mpa to pressures approximately ranging from 0.2 to 0.3 Mpa. As a result of this, the fuel cell 200 is not damaged since the high-pressure hydrogen gas is not supplied to the fuel cell 200.

When the depressurizing valve 418 for the primary depressurization depressurizes the high-pressure hydrogen gas from pressures approximately ranging from 20 to 35 Mpa to pressures approximately ranging from 0.8 to 1 Mpa, the discharge temperature of hydrogen discharged from the high-pressure hydrogen gas tank 300 varies depending on pressure and flow rate since the discharge is accompanied by expansion. The present preferred embodiment adopts a structure in which the heat exchanger 420 is provided between the depressurizing valve 418 for the primary depressurization and the depressurizing valve 422 for the secondary depressurization to exchange heat with the depressurized hydrogen gas. The heat exchanger 420 is supplied with water coolant (not shown) which has circulated in the fuel cell 200 and the supplied water coolant exchanges heat with the hydrogen gas whose temperature has varied. The hydrogen gas can be supplied to the fuel cell 200 since the temperature of the hydrogen gas changes to within an appropriate temperature range after the hydrogen gas flows through the heat exchanger 420. Therefore, electric-chemical reaction proceeds well since a sufficient reaction temperature can be provided so that the fuel cell 200 generates power appropriately.

As described, water ($H_2O$) is formed on the side of the oxygen electrode in the fuel cell 200 according to the formula (2). Then the water in the state of steam permeates into the side of the hydrogen electrode through the electrolytic membrane. Therefore, the hydrogen off-gas discharged from the fuel cell 200 is wet and contains a lot of moisture. According to the present preferred embodiment, the gas-liquid separator 406 is provided at a point midway of the circulation channel 403. Moisture contained in the hydrogen off-gas is separated into gas and liquid by the gas-liquid separator 406, and the liquid moisture is removed. Then only the separated gas (steam) along with other kinds of gas are introduced into the pump 410. As a result of this, only the gaseous moisture is contained in the hydrogen gas so that the fuel cell continues generating power efficiently since moisture mixed with liquid and gas is not supplied to the fuel cell 200.

The pressure of the hydrogen gas supplied to the fuel cell 200 may abnormally increase if the depressurizing valve 418 or the depressurizing valve 422 malfunctions. To deal with the case above, the relief valve 414 is provided on the relief channel 407 which branches after the depressurizing valve 418 on the main channel 401, and the relief valve 416 is provided on the relief channel 409 which branches after the depressurizing valve 422. As a result of this, the relief valve 414 opens when pressure of the hydrogen gas in the main channel 401 between the depressurizing valve 418 and the depressurizing valve 422 becomes equal to or greater than a predetermined value. The relief valve 416 opens when pressure of the hydrogen gas in the main channel 401 between the depressurizing valve 422 and the fuel cell 200 becomes equal to or greater than a predetermined value. Therefore, the above-described two relief valves exhaust the hydrogen gas into the external atmosphere to prevent the hydrogen gas from exceeding the predetermined pressure further.

When charging the high-pressure hydrogen tank 300 with hydrogen gas, a hydrogen gas supplying pipe (not shown) is connected to the hydrogen gas supplying port 428 and the charge manual valve 308 attached to the high-pressure hydrogen tank 300 is manually opened. As a result of this, the high-pressure hydrogen tank 300 is charged with the high-pressure hydrogen gas supplied from the hydrogen gas supplying pipe after the high-pressure hydrogen gas flows through the supplying channel 413. The reverse flow preventing valve 306 is provided at the base of the high-pressure hydrogen tank 300 to prevent an accident caused by reverse flow of high-pressure hydrogen gas.

FIG. 2 is a cross-sectional view schematically showing a vertical section of a vehicle equipped with the fuel cell system shown in FIG. 1. The fuel cell system 100 of the present preferred embodiment is arranged in the vehicle 10 as shown in FIG. 2. Namely, the fuel cell 200, the power control unit 700 and the compressor 504 are arranged in a front part 10*a* of the vehicle 10. The hydrogen gas channels 401 and 403, and the pump 410, are arranged in an under-floor part 10*b*. The high-pressure hydrogen tank 300 and the hydrogen gas supplying port 428 are arranged in a rear part 10*c*.

Along with the fuel system shown in the FIG. 1, the following components are arranged in the above-mentioned three parts (10*a*, 10*b*, and 10). The driving motor 800 for generating thrust of the vehicle 10 by generated power from the fuel cell 200, a gear 810 for transmitting torque generated from the driving motor 800 to the axle shaft of the vehicle, a radiator 820 for cooling the driving motor 800, a condenser 830 for an air conditioner and a main radiator 840 for cooling the fuel cell 200 are arranged in the front part 10*a*. A sub-radiator 850 for cooling the fuel cell 200 is arranged in the under-floor part 10*b*. A secondary cell 860 for assisting the fuel cell 200 is arranged in the rear part 10*c*.

One of the features of the electric vehicle is that the motor 800, the fuel cell 200, and the control unit 700 for controlling the motor 800 and the fuel cell 200 are arranged in the front part 10*a*, in other words, in a space under a hood. A space for passengers is not greatly restrained by this arrangement with these components including the motor 800, the fuel cell 200, and the power control unit 700. Therefore, an advantage of easily securing a sufficient space for passengers is provided.

Figure 3A:
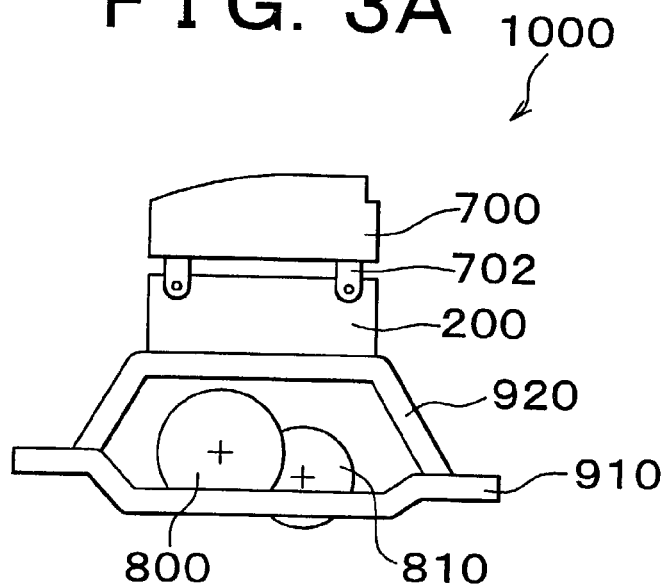
FIGS. 3A and 3B are side and top views of a structure of an assembled body 1000 including a motor 800, a fuel cell 200, and a power control unit 700.

The following explains the structure of the assembled body in the electric-driving system. FIG. 3A shows the structure of the assembled body 1000 including the motor 800, the fuel cell 200 and the power control unit 700. The assembled body 1000 includes a suspension frame 910 and a fuel cell (FC) frame 920 fixed on the suspension frame 910. The motor 800 and the gear 810 are mounted on the suspension frame 910 via a rubber mount (not shown). The fuel cell 200 is fixed on the FC frame 920 and the power control unit 700 is fixed on the fuel cell 200. The motor as a vibrator and the fuel cell and the control unit as non-vibrators are mounted on the different frames. Therefore, the assembled body 1000 has a structure in which vibrations from the motor are not easily transmitted to the fuel cell and the control unit. Furthermore, the number of components of the vehicle can be decreased since the motor can be mounted on the vehicle body by applying it to the suspension frame.

Figure 3B:
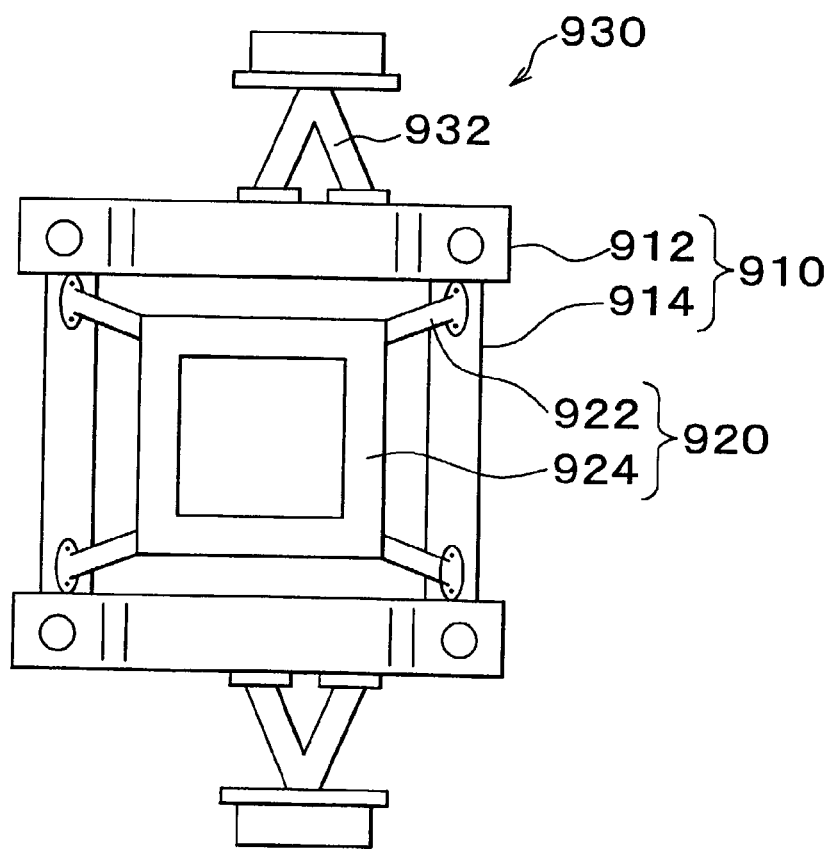

FIG. 3B is a top view showing the suspension frame 910 and the FC frame 920. The suspension frame 910 has the shape of a double cross. Two approximately parallel connection beams 914 are provided between approximately parallel side beams 912. The side beams 912 are connected to lower arms 932 of a front suspension 930.

The FC frame 920 includes four leg parts 922 and a rectangular frame part 924 provided on the leg parts 922. The leg parts 922 are fixed on the connection beams 914. A body can easily be assembled by joining the suspension frame 910 and the FC frame 920.

In this assembled body 1000, a special component is not needed to mount the motor 860 on the vehicle body since the motor 800 is mounted on the suspension frame 910. Therefore, the number of components necessary for the vehicle can be decreased.

Vibrations of the motor can be considerably weakened by the rubber mount since the motor 800 as a vibrating source is mounted on the suspension frame 910 through the rubber mount. Therefore, the possibility of problems in the fuel cell 200 or the power control unit 700 caused by motor vibration can be lowered. In this connection, a motor mount including an elastic body (rubber, for example) can be provided between the suspension frame 910 and the FC frame 920 to further restrain transmission of motor vibrations.

As shown in FIG. 3A, the power control unit 700 is fixed by brackets 702 above the fuel cell 200 with a gap between the fuel cell 200 and the control unit 700. The power control unit 700 includes a lot of power semiconductor elements so that considerable amount of heat is generated from these power semiconductor elements. According to the structure shown in FIG. 3A, the power unit 700 emits heat but a temperature rise of the power control unit 700 can be alleviated since a space is provided around the entire surface of the power control unit 700. Therefore, it is preferable that the power control unit be arranged at the upper most part of the assembled body 1000. Considering these matters, an advantage of mounting the motor 800, the fuel cell 200, and the power control unit 700 in ascending order as shown in FIG. 3A is understandable.

Figure 4:
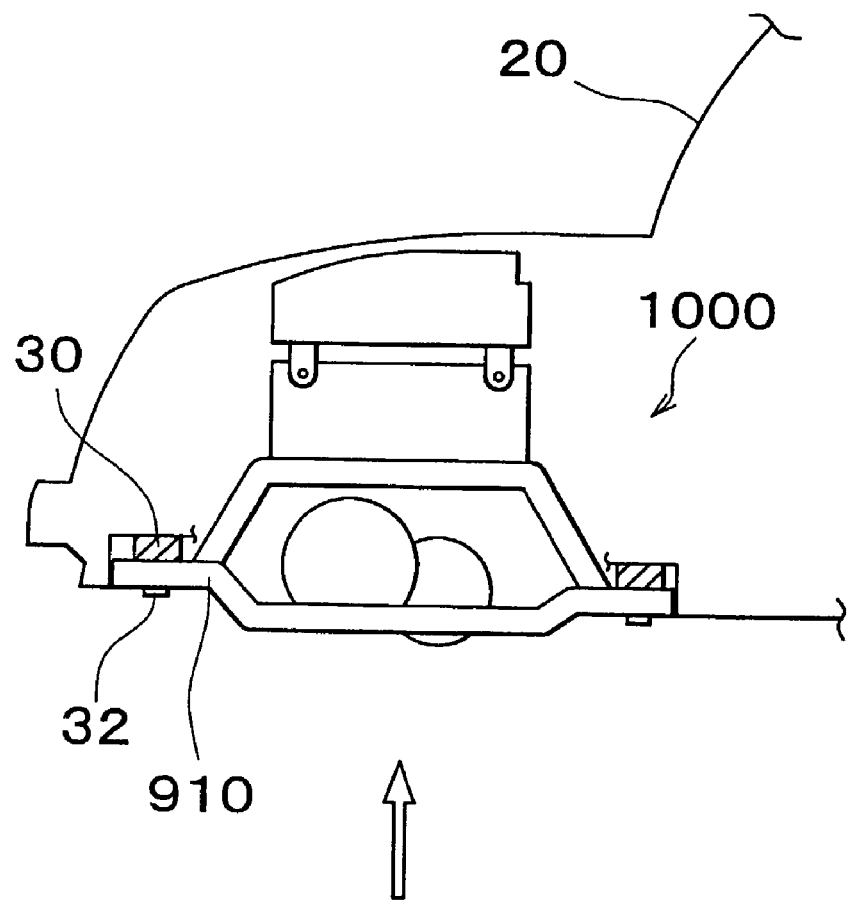
FIG. 4 is an explanatory view showing a step of mounting the assembled body 1000 on a vehicle body 20.
Figure 4:
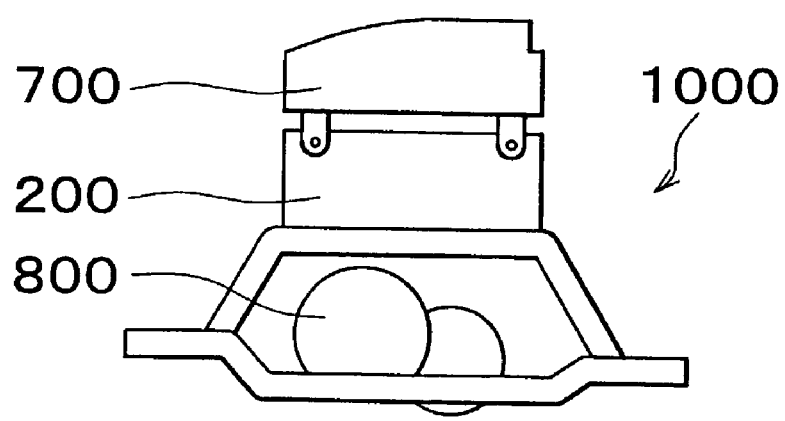

FIG. 4 shows the step of mounting the assembled body 1000 on the vehicle body 20. The assembled body 1000 is mounted on the vehicle body 20 from the underside of the vehicle body 20. At this time, a mount 30 made of rubber is inserted between the assembled body 1000 and the vehicle body 20, and a bolt 32 is screwed into the above-mentioned components. As described above, the components including the motor 800, the fuel cell 200, and the power control unit 700 can be installed in the vehicle easily since these components are integrally assembled to form the assembled body 1000, then the assembled body is mounted on the vehicle. In this case, the components of the fuel cell 200 can be mounted on the vehicle in a way that the assembled body 1000 is installed under the hood of the vehicle body to reduce restriction on a space for passengers caused by the assembled body 1000.

The present invention is not limited to the above-described preferred embodiment and the aspects. Therefore, the present invention can be embodied by various alternatives so long as the objects of the present invention are satisfied. For example, aspects changed in the following ways are possible.

Though hydrogen gas is supplied from the high-pressure hydrogen tank 300 according to the above-described preferred embodiment, hydrogen gas may be supplied from a fuel reforming device instead.

Though the assembled body 1000 including the motor 800, the fuel cell 200, and the power control unit 700 is used according to the above-described preferred embodiment, it is not necessary to form one assembled body including these components. These components may be arranged at least in the same space of a vehicle body. When these components are arranged under a hood of the vehicle, restriction on a space for passengers caused by these components can be minimized.

Though the motor 800, the fuel cell 200, and the power control unit 700 are arranged in ascending order in the vehicle according to the above-described preferred embodiment, these components may be arranged in different orders. For example, only the fuel cell 200 may be mounted on the FC frame 920, and the power control unit 700 may be arranged at a different position. Furthermore, the fuel cell 200 and the power control unit 700 may be arranged in a way that these components line up horizontally on the FC frame 920.

What is claimed is:

1. An electric vehicle comprising:
a vehicle body;
a motor which drives an axle shaft of the vehicle;
a fuel cell which supplies power to the motor; and
a control unit which controls operations of the motor and the fuel cell, wherein the motor, the fuel cell, and the control unit are arranged in a first space of the vehicle body and are mounted in ascending order;
a fuel supply source arranged in a second space which is different from said first space and is under a passenger seat of the vehicle, which fuel supply source supplies fuel to the fuel cell;
a channel which connects the fuel cell and the fuel supply source and introduces the fuel from the fuel supply source to the fuel cell;
a first frame; and
a second frame different from the first frame,
wherein the motor is mounted on the first frame, the fuel cell is fixed on the second frame, and the control unit is fixed on the fuel cell.

2. The electric vehicle according to claim 1, wherein; the first space of the vehicle body is a space under a hood.

3. The electric vehicle according to claim 1, wherein; the motor, the fuel cell, and the control unit are integrally assembled to form an assembled body; and the assembled body is mounted on the vehicle body.

4. The electric vehicle according to claim 1, wherein; the motor is mounted on the first frame via an elastic body.

5. The electric vehicle according to claim 1, wherein; the first frame is a suspension frame connected to a suspension structure and fixed on the vehicle body.

6. The electric vehicle according to claim 1, wherein said second frame is separate from said first frame.

7. The electric vehicle according to claim 6, wherein said second frame is fixed on said first frame.

* * * * *